US012717537B2

(12) United States Patent
Choi et al.

(10) Patent No.: US 12,717,537 B2
(45) Date of Patent: Aug. 25, 2026

(54) DISPLAY APPARATUS FOR EXPANDING SCREEN AREA AND CONTROL METHOD THEREOF

(71) Applicant: SAMSUNG ELECTRONICS CO., LTD., Suwon-si (KR)

(72) Inventors: Eunha Choi, Suwon-si (KR); Joayoung Lee, Suwon-si (KR); Changmo Yang, Suwon-si (KR); Junyoung Im, Suwon-si (KR); Younju Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/806,166

(22) Filed: Aug. 15, 2024

(65) Prior Publication Data

US 2025/0077160 A1 Mar. 6, 2025

Related U.S. Application Data

(63) Continuation of application No. PCT/KR2024/008806, filed on Jun. 25, 2024.

(30) Foreign Application Priority Data

Sep. 4, 2023 (KR) ........................ 10-2023-0117118

(51) Int. Cl.
*G06F 3/14* (2006.01)
*G06T 3/4023* (2024.01)
(Continued)

(52) U.S. Cl.
CPC .......... *G06F 3/1446* (2013.01); *G06T 3/4023* (2013.01); *G06T 7/20* (2013.01); *G06T 11/00* (2013.01)

(58) Field of Classification Search
CPC . G06F 3/14; G06F 3/1446; G06T 3/40; G06T 2210/22; G06T 7/20; G06T 11/00; G06T 2207/20132
See application file for complete search history.

(56) References Cited

U.S. PATENT DOCUMENTS 10,306,179 B2 5/2019 Byun et al.
10,650,790 B2 * 5/2020 Maalouf ............... G06F 3/1423
(Continued)

FOREIGN PATENT DOCUMENTS

CN 111634188 A 9/2020
KR 10-2018-0069576 A 6/2018
(Continued)

OTHER PUBLICATIONS

International Search Report (PCT/ISA/210) issued on Oct. 17, 2024 by the International Searching Authority in International Application No. PCT/KR2024/008806.
(Continued)

*Primary Examiner* — Scott D Au
(74) *Attorney, Agent, or Firm* — Sughrue Mion, PLLC

(57) ABSTRACT

A display apparatus includes a display, a communication interface, memory configured to store instructions, and at least one processor operatively connected with the display, the communication interface and the memory and configured to execute the instructions. The instructions, when executed by the at least one processor, cause the display apparatus to: display a first image on the display; identify a motion of an object included in the first image; obtain a second image including the object based on the identified motion; and stream the second image to another display apparatus through the communication interface.

17 Claims, 10 Drawing Sheets

(51) Int. Cl.
*G06T 7/20* (2017.01)
*G06T 11/00* (2006.01)

(56) References Cited

U.S. PATENT DOCUMENTS

| | | | |
|---|---|---|---|
| 10,990,339 B2 | 4/2021 | Park et al. | |
| 11,341,882 B2 * | 5/2022 | Ryu | G09G 3/20 |
| 11,651,749 B2 | 5/2023 | Simmons et al. | |
| 11,757,366 B2 | 9/2023 | Cao et al. | |
| 11,852,942 B2 | 12/2023 | Wang et al. | |
| 12,033,348 B1 * | 7/2024 | Goyal | G06T 7/20 |
| 2014/0022329 A1 * | 1/2014 | Kim | H04N 7/147 348/14.03 |
| 2018/0176505 A1 * | 6/2018 | Byun | H04N 7/0127 |
| 2021/0376746 A1 | 12/2021 | Cao et al. | |
| 2023/0070646 A1 | 3/2023 | Wang et al. | |
| 2023/0122934 A1 | 4/2023 | Kwon et al. | |
| 2023/0169628 A1 | 6/2023 | Yu et al. | |
| 2023/0169632 A1 * | 6/2023 | Kulkarni | G06T 11/00 382/276 |
| 2023/0178560 A1 | 6/2023 | Wang et al. | |
| 2024/0020084 A1 | 1/2024 | Lee et al. | |
| 2024/0063724 A1 | 2/2024 | Cao et al. | |
| 2025/0291539 A1 | 9/2025 | Jang et al. | |

FOREIGN PATENT DOCUMENTS

| | | |
|---|---|---|
| KR | 10-2348429 B1 | 1/2022 |
| KR | 10-2022-0138663 A | 10/2022 |
| KR | 10-2023-0053204 A | 4/2023 |
| KR | 10-2023-0080573 A | 6/2023 |
| KR | 10-2023-0085495 A | 6/2023 |
| KR | 10-2024-0103319 A | 7/2024 |

OTHER PUBLICATIONS

Written Opinion (PCT/ISA/237) issued on Oct. 17, 2024 by the International Searching Authority in International Application No. PCT/KR2024/008806.

Anonymous, "Next-generation sensor using UWB technology," KT Enterprise, Apr. 15, 2021, Retrieved from https://enterprise.kt.com/bt/dxstory/581.do, total 12 pages.

* cited by examiner

DISPLAY APPARATUS FOR EXPANDING SCREEN AREA AND CONTROL METHOD THEREOF

CROSS-REFERENCE TO RELATED APPLICATIONS

This application is a continuation of PCT/KR2024/008806, filed on Jun. 25, 2024, at the Korean Intellectual Property Receiving Office and claims priority under 35 U.S.C. § 119 to Korean Patent Application No. 10-2023-0117118, filed on Sep. 4, 2023, in the Korean Intellectual Property Office, the disclosure of which is incorporated by reference herein in its entirety.

BACKGROUND

1. Field

The disclosure relates to a display apparatus and a control method thereof, and more particularly, to a display apparatus that expands a screen area and a control method thereof.

2. Description of Related Art

As electronic technologies have developed, electronic apparatuses providing various functions are being developed. In particular, users may use display apparatuses in various types, and thus users' convenience is improving.

For example, various display apparatuses such as a desktop personal computer (PC), a tablet PC, a smartphone, etc. are being provided to users, and are providing more diverse user experiences.

SUMMARY

According to an aspect of the disclosure, a display apparatus includes a display; a communication interface; memory configured to store instructions; and at least one processor operatively connected with the display, the communication interface, and the memory, and configured to execute the instructions, wherein the instructions, when executed by the at least one processor, cause the display apparatus to: control the display to display a first image on the display; identify a motion of an object included in the first image; obtain a second image including the object based on the identified motion; and stream the second image to another display apparatus through the communication interface.

The instructions, when executed by the at least one processor, may further cause the display apparatus to stream, through the communication interface, the second image to the another display apparatus that is in a location corresponding to the identified motion among a plurality of other display apparatuses located in a vicinity the display apparatus.

The instructions, when executed by the at least one processor, may further cause the display apparatus to: identify a location of the another display apparatus by performing communication with the another display apparatus through the communication interface; and obtain the second image based on the identified motion and the location of the another display apparatus.

The instructions, when executed by the at least one processor, may further cause the display apparatus to identify the location of the another display apparatus by performing communication with the another display apparatus through an ultra-wideband communication standard.

The instructions, when executed by the at least one processor, may further cause the display apparatus to: transmit, through the communication interface, a signal to the another display apparatus requesting information on another display included in the another display apparatus; obtain the information on the another display from the another display apparatus through the communication interface; and obtain the second image based on the identified motion and the information on the another display.

The information on the another display may include at least one of a size, a resolution, a screen ratio, or a form factor of the another display.

The instructions, when executed by the at least one processor, may further cause the display apparatus to obtain the second image by outpainting a background area of the object.

The instructions, when executed by the at least one processor, further cause the display apparatus to generate a sound of the second image based on a sound of the object included in the first image.

The instructions, when executed by the at least one processor, may further cause the display apparatus to: identify an alignment state of the display apparatus and the another display apparatus; and obtain the second image based on the alignment state.

The instructions, when executed by the at least one processor, may further cause the display apparatus to, based on obtaining guide information that the another display apparatus is used from the another display apparatus through the communication interface, stop an obtaining operation of the second image and a streaming operation of the second image.

According to an aspect of the disclosure, a control method of a display apparatus includes: displaying a first image; identifying a motion of an object included in the first image; obtaining a second image including the object based on the identified motion; and streaming the second image to another display apparatus.

The streaming may include streaming the second image to the another display apparatus that is in a location corresponding to the identified motion among a plurality of other display apparatuses located in a vicinity the display apparatus.

The method may include identifying a location of the another display apparatus by performing communication with the another display apparatus, wherein the obtaining may include obtaining the second image based on the identified motion and the location of the another display apparatus.

The identifying the location of the another display apparatus may include identifying the location of the another display apparatus by performing communication with the another display apparatus through an ultra-wideband communication standard.

The obtaining may include transmitting a signal to the another display apparatus requesting information on another display included in the another display apparatus; obtaining the information on the another display from the another display apparatus; and obtaining the second image based on the identified motion and the information on the another display.

According to an aspect of the disclosure, a display apparatus includes at least one memory configured to store instructions, wherein the instructions, when executed by at least one processor, cause the display apparatus to: display a first image; identify a motion of an object included in the first image; obtain a second image including the object based on the identified motion; and stream the second image to another display apparatus.

The instructions, when executed by the at least one processor, may further cause the display apparatus to stream the second image to the another display apparatus that is in a location corresponding to the identified motion among a plurality of other display apparatuses located in a vicinity the display apparatus.

The instructions, when executed by the at least one processor, may further cause the display apparatus to: identify a location of the another display apparatus by performing communication with the another display apparatus; and obtain the second image based on the identified motion and the location of the another display apparatus.

The instructions, when executed by the at least one processor, may further cause the display apparatus to identify the location of the another display apparatus by performing communication with the another display apparatus through an ultra-wideband communication standard.

The instructions, when executed by the at least one processor, may further cause the display apparatus to: transmit a signal to the another display apparatus requesting information on another display included in the another display apparatus; obtain the information on the another display from the another display apparatus; and obtain the second image based on the identified motion and the information on the another display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
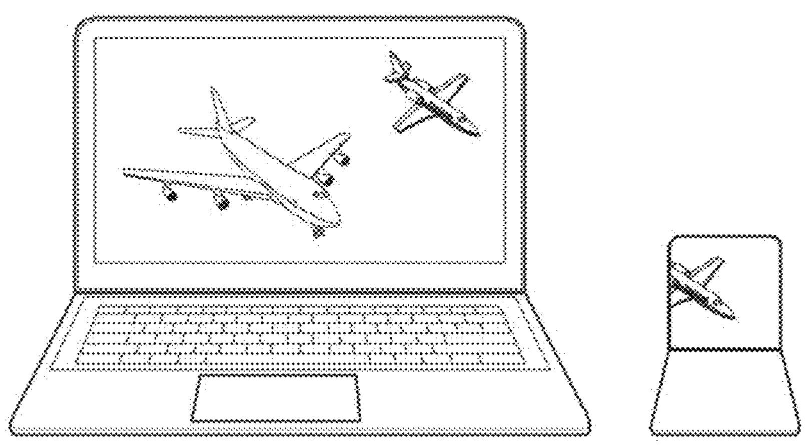
FIG. 1 is a diagram illustrating a configuration of a display system, according to an embodiment of the disclosure.

The example embodiments of the present disclosure may be diversely modified. Accordingly, specific example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail since they would obscure the disclosure with unnecessary detail.

The purpose of the disclosure is in providing a display apparatus for providing more immersion and stereoscopic effect to a user by expanding a screen area, and a control method thereof.

Below, the disclosure will be described in detail with reference to the accompanying drawings.

As terms used with respect to the embodiments of the disclosure, general terms that are currently used widely were selected, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this disclosure, expressions such as "have," "may have," "include," and "may include" denote the existence of such characteristics (e.g., elements such as numbers, functions, operations, and components), and do not exclude the existence of additional characteristics.

Throughout the disclosure, the expression "at least one of a, b or c" indicates only a, only b, only c, both a and b, both a and c, both b and c, or all of a, b, and c.

Further, the expressions "first," "second," and the like used in this disclosure may be used to describe various elements regardless of any order and/or degree of importance. In addition, such expressions are used only to distinguish one element from another element, and are not intended to limit the elements.

Also, singular expressions include plural expressions, unless defined obviously differently in the context. Further, in the disclosure, terms such as "include" and "consist of" should be construed as designating that there are such characteristics, numbers, steps, operations, elements, components, or a combination thereof described in the disclosure, but not as excluding in advance the existence or possibility of adding one or more of other characteristics, numbers, steps, operations, elements, components, or a combination thereof.

In this disclosure, the term "user" may refer to a person who uses an electronic apparatus or an apparatus using an electronic apparatus (e.g., an artificial intelligence electronic apparatus).

Below, various embodiments of the disclosure will be described in more detail with reference to the accompanying drawings.

FIG. 1 is a diagram illustrating a configuration of a display system 1000 according to an embodiment of the disclosure. As illustrated in FIG. 1, the display system 1000 may include a plurality of display apparatuses. For example, the display system 1000 may include a laptop and a smartphone.

The laptop may display an image, and provide a part of the image to the smartphone. For example, the laptop may display a first image, identify a motion of an object included in the first image, obtain a second image including the object based on the identified motion, and stream the second image to the smartphone.

The smartphone may display the second image received from the laptop.

Through such an operation, a user can view the image not only through the laptop but also through the smartphone, and thus the immersion, the stereoscopic effect, etc. of image viewing can be improved.

Figure 2:
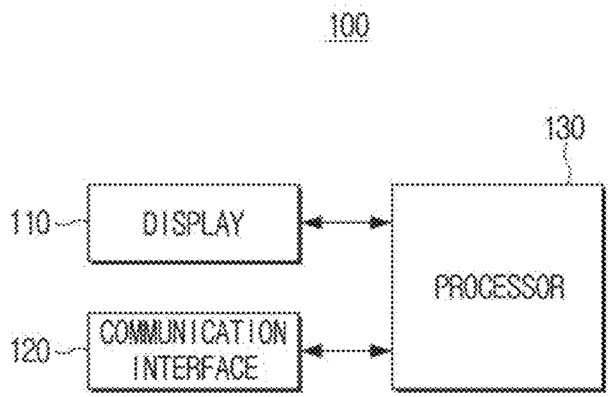
FIG. 2 is a block diagram illustrating a configuration of a display apparatus, according to an embodiment of the disclosure.

FIG. 2 is a block diagram illustrating a configuration of a display apparatus 100 according to an embodiment of the disclosure.

The display apparatus 100 may display an image, and provide the image to another display apparatus 200. For example, the display apparatus 100 may be an apparatus that includes a display, and displays an image through the display, and provides the image to another display apparatus 200 such as a TV, a desktop PC, a laptop, a smartphone, a tablet PC, etc. However, the disclosure is not limited thereto, and any device can be the display apparatus 100 if it can display an image, and provide the image to another apparatus.

The display apparatus 100 may provide an image to the another display apparatus 200, but embodiments of the disclosure are not limited thereto. For example, the display apparatus 100 may provide some areas of an image to the another display apparatus 200. Alternatively, the display apparatus 100 may provide only some frames of an image to the another display apparatus 200. Alternatively, the display apparatus 100 may generate a separate image based on an object included in an image, and provide the generated image to the another display apparatus 200.

According to FIG. 2, the display apparatus 100 includes a display 110, a communication interface 120, and a processor 130.

The display 110 is a component displaying an image, and it may be implemented as displays in various forms such as a liquid crystal display (LCD), an organic light emitting diodes (OLED) display, a plasma display panel (PDP), etc. Inside the display 110, driving circuits that may be implemented in forms such as an a-si TFT, a low temperature poly silicon (LTPS) TFT, an organic TFT (OTFT), etc., a backlight unit, etc. may also be included. The display 110 may be implemented as a touch screen combined with a touch sensor, a flexible display, a three-dimensional (3D) display, etc.

The communication interface 120 is a component that performs communication with external apparatuses in various types according to communication methods in various types. For example, the display 100 may perform communication with the another display apparatus 200 through the communication interface 120. For example, the display apparatus 100 may perform communication with the another display apparatus 200 through an ultra-wideband (UWB) communication standard, and identify the location of the another display apparatus 200.

The communication interface 120 may include a Wi-Fi module, a Bluetooth module, an infrared communication module, and a wireless communication module, etc. Here, each communication module may be implemented in a form of at least one hardware chip.

A Wi-Fi module and a Bluetooth module perform communication by a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter. An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

Alternatively, the communication interface 120 may include a wired communication interface such as an HDMI, a DP, a Thunderbolt, a USB, an RGB, a D-SUB, a DVI, etc.

Other than the above, the communication interface 120 may include at least one of a local area network (LAN) module, an Ethernet module, or a wired communication module that performs communication by using a pair cable, a coaxial cable, or an optical fiber cable, etc.

The processor 130 controls the overall operations of the display apparatus 100. Specifically, the processor 130 may be connected with each component of the display apparatus 100, and control the overall operations of the display apparatus 100. For example, the processor 130 may be connected with components such as the display 110, the communication interface 120, a memory, etc., and control the operations of the display apparatus 100.

The at least one processor 130 may include one or more of a central processing unit (CPU), a graphics processing unit (GPU), an accelerated processing unit (APU), a many integrated core (MIC), a neural processing unit (NPU), a hardware accelerator, or a machine learning accelerator. The at least one processor 130 may control one or a random combination of the other components of the display apparatus 100, and perform an operation related to communication or data processing. Also, the at least one processor 130 may execute one or more programs or instructions stored in the memory. For example, the at least one processor 130 may perform the method according to an embodiment of the disclosure by executing one or more instructions stored in the memory.

In case the method according to an embodiment of the disclosure includes a plurality of operations, the plurality of operations may be performed by one processor, or performed by a plurality of processors. For example, when a first operation, a second operation, and a third operation are performed by the method according to an embodiment, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The at least one processor 130 may be implemented as a single core processor including one core, or it may be implemented as one or more multicore processors including a plurality of cores (e.g., multicores of the same kind or multicores of different kinds). In case the at least one processor 130 is implemented as multicore processors, each of the plurality of cores included in the multicore processors may include an internal memory of the processor such as a cache memory, an on-chip memory, etc., and a common cache shared by the plurality of cores may be included in the multicore processors. Also, each of the plurality of cores (or some of the plurality of cores) included in the multicore processors may independently read a program instruction for implementing the method according to an embodiment of the disclosure and perform the instruction, or the plurality of entire cores (or some of the cores) may be linked with one another, and read a program instruction for implementing the method according to an embodiment of the disclosure and perform the instruction.

In case the method according to an embodiment of the disclosure includes a plurality of operations, the plurality of operations may be performed by one core among the plurality of cores included in the multicore processors, or they may be implemented by the plurality of cores. For example, when the first operation, the second operation, and the third operation are performed by the method according to an embodiment, all of the first operation, the second operation, and the third operation may be performed by a first core included in the multicore processors, or the first operation and the second operation may be performed by the first core included in the multicore processors, and the third operation may be performed by a second core included in the multicore processors.

In the embodiments of the disclosure, the at least one processor 130 may mean a system on chip (SoC) wherein at least one processor and other electronic components are integrated, a single core processor, a multicore processor, or a core included in the single core processor or the multicore processor. Also, here, the core may be implemented as a CPU, a GPU, an APU, a MIC, an NPU, a hardware accelerator, or a machine learning accelerator, etc., but the embodiments of the disclosure are not limited thereto. However, below, the operations of the display apparatus 100 will be explained with the expression 'the processor 130,' for convenience of explanation.

The processor 130 may control the display 110 to display a first image, and identify a motion of an object included in the first image. For example, the processor 130 may control the display 110 to sequentially display a plurality of frames included in the first image, identify an object in each frame, and identify a motion of the object by comparing the location of the object in each frame.

The processor 130 may obtain a second image including the object based on the identified motion. For example, if a person dancing in place is identified as an object in the first image, the processor 130 may obtain the second image by cropping an area including the person in each frame. Alternatively, if a car moving to the right is identified as an object in the first image, the processor 130 may obtain the second image by cropping an area including the car in each frame. That is, the processor 130 may change an area cropped in each frame according to a motion of an object.

The processor 130 may control the communication interface 120 to stream the second image to the another display apparatus 200 arranged around the display apparatus 100. For example, the processor 130 may control the communication interface 120 to stream the second image wherein an area including the object is cropped in each frame to the another display apparatus 200.

The processor 130 may control the communication interface 120 to stream the second image to the another display apparatus 200 arranged in a location corresponding to the identified motion among a plurality of other display apparatuses located around the display apparatus 100.

For example, in a state wherein a first another display apparatus is arranged on the left side of the display apparatus 100, and a second another display apparatus is arranged on the right side of the display apparatus 100, if a car moving to the right is identified in the first image, the processor 130 may obtain the second image by cropping an area including the car in each frame, and provide the second image to the second another display apparatus.

The processor 130 may identify the location of the another display apparatus 200 by performing communication with the another display apparatus 200 through the communication interface 120, and obtain the second image based on the identified motion and the location of the another display apparatus 200. For example, if a car moving to the right is identified in the first image, and it is identified that the another display apparatus 200 is arranged on the right side of the display apparatus 100, the processor 130 may obtain the second image by cropping an area including the car in each frame, and provide the second image to the second another display apparatus. Alternatively, if a car moving to the right is identified in the first image, and it is identified that the another display apparatus 200 is arranged on the left side of the display apparatus 100, the processor 130 may not obtain the second image.

The processor 130 may identify a time point of transmitting the second image based on the location of the another display apparatus 200. For example, the processor 130 may transmit the second image more slowly in a case wherein the another display apparatus 200 is spaced from the display apparatus 100 by 20 cm than in a case wherein the another display apparatus 200 is spaced from the display apparatus 100 by 10 cm. However, embodiments of the disclosure are not limited thereto, and the processor 130 may change a time point of generating the second image based on the location of the another display apparatus 200. For example, the processor 130 may generate the second image more slowly in a case wherein the another display apparatus 200 is spaced from the display apparatus 100 by 20 cm than in a case wherein the another display apparatus 200 is spaced from the display apparatus 100 by 10 cm.

The processor 130 may identify the location of the another display apparatus 200 by performing communication with the another display apparatus 200 through the ultra-wideband (UWB) communication standard.

The above is merely an example, and the processor 130 may identify the location of the another display apparatus 200 by using numerous various methods.

The processor 130 may control the communication interface 120 to transmit a signal requesting information on another display included in the another display apparatus 200 to the another display apparatus 200, receive the information on the another display from the another display apparatus 200 through the communication interface 120, and obtain the second image based on the identified motion and the information on the another display. Here, the information on the another display may include at least one of a size, a resolution, a screen ratio, or a form factor of the another display.

For example, if the another display is in a 4:3 ratio, the processor 130 may obtain the second image by cropping the first image in a 4:3 ratio. Alternatively, if the another display is foldable or rollable, the processor 130 may obtain the second image based on a smaller size than the entire size of the another display.

However, embodiments of the disclosure are not limited thereto, and the processor 130 may obtain the second image by considering a scanning rate of the another display, a communication state with the another display apparatus 200, etc.

The processor 130 may obtain the second image by outpainting a background area of an object. For example, if a car moving to the right is identified in the first image, the processor 130 may obtain the second image by cropping only the car in the first image, and outpainting the background area of the car.

The processor 130 may generate the sound of the second image based on the sound of the object included in the first image.

The processor 130 may identify an alignment state of the display apparatus 100 and the another display apparatus 200, and obtain the second image based on the alignment state.

If guide information that the another display apparatus 200 is used is received from the another display apparatus 200 through the communication interface 120, the processor 130 may stop an obtaining operation of the second image and a streaming operation of the second image. For example, in case the user uses the another display apparatus 200, the another display apparatus 200 may not display the second image even if the display apparatus 100 provides the second image. Accordingly, if guide information that the another display apparatus 200 is used is received from the another display apparatus 200, the processor 130 may reduce power consumption by stopping an obtaining operation of the second image and a streaming operation of the second image.

However, embodiments of the disclosure are not limited thereto, and if guide information that the another display apparatus 200 is used is received from the another display apparatus 200 through the communication interface 120, the processor 130 may reduce the resolution of the second image in an obtaining process of the second image. For example, even if the user uses the another display apparatus 200, the second image received from the display apparatus 100 may be displayed in a pop-up form. In this case, even if guide information that the another display apparatus 200 is used is received from the another display apparatus 200, the processor 130 may obtain the second image while reducing the resolution, and stream the second image of which resolution has been reduced to the another display apparatus 200, and thereby reduce power consumption.

Figure 3:
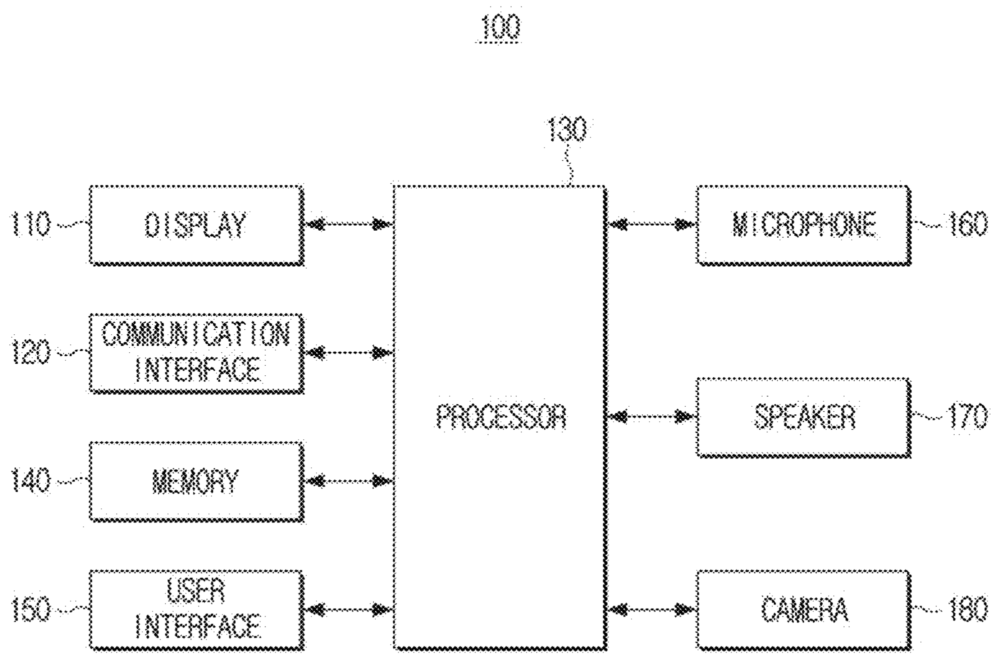
FIG. 3 is a block diagram illustrating a detailed configuration of a display apparatus, according to an embodiment of the disclosure.

FIG. 3 is a block diagram illustrating a detailed configuration of the display apparatus 100 according to an embodiment of the disclosure. The display apparatus 100 may include a display 110, a communication interface 120, and a processor 130. Also, according to FIG. 3, the display apparatus 100 may further include a memory 140, a user interface 150, a microphone 160, a speaker 170, and a camera 180. Among the components illustrated in FIG. 3, regarding parts overlapping with the components illustrated in FIG. 2, detailed explanation will be omitted.

The memory 140 may refer to hardware that stores information such as data, etc. in an electric or a magnetic form such that the processor 130, etc. can access the information. For this, the memory 140 may be implemented as one or more of a non-volatile memory, a volatile memory, a flash memory, a hard disk drive (HDD) or a solid state drive (SSD), a RAM, a ROM, etc.

In the memory 140, at least one instruction necessary for operations of the display apparatus 100 or the processor 130 may be stored. Here, an instruction is a code unit instructing the operation of the display apparatus 100 or the processor 130, and it may have been drafted in a machine language which is a language that can be understood by a computer. Alternatively, in the memory 140, a plurality of instructions that perform specific tasks of the display apparatus 100 or the processor 130 may be stored as an instruction set.

In the memory 140, data which is information in bit or byte units that can indicate characters, numbers, images, etc. may be stored. For example, in the memory 140, location information of the another display apparatus 200, an image processing module, etc. may be stored.

The memory 140 may be accessed by the processor 130, and reading/recording/correction/deletion/update, etc. for an instruction, an instruction set, or data may be performed by the processor 130.

The user interface 150 may be implemented as a button, a touch pad, a mouse, and a keyboard, etc., or implemented as a touch screen that can perform both a display function and a manipulation input function. Here, a button may be various types of buttons such as a mechanical button, a touch pad, a wheel, etc. formed in any areas such as the front surface part or the side surface part, the rear surface part, etc. of the exterior of the main body of the display apparatus 100.

The microphone 160 is a component for receiving input of a sound and converting the sound into an audio signal. The microphone 160 may be electrically connected with the processor 130, and receive a sound by control by the processor 130.

For example, the microphone 160 may be formed as an integrated type integrated to the upper side or the front surface direction, the side surface direction, etc. of the display apparatus 100. Alternatively, the microphone 160 may be provided on a separate remote control from the display apparatus 100. In this case, the remote control may receive a sound through the microphone 160, and provide the received sound to the display apparatus 100.

The microphone 160 may include various components such as a microphone collecting a sound in an analogue form, an amp circuit amplifying the collected sound, an A/D conversion circuit that samples the amplified sound and converts the sound into a digital signal, a filter circuit that removes noise components from the converted digital signal, etc.

The microphone 160 may be implemented in the form of a sound sensor, and it can be of any type if it is a component that can collect sounds.

The speaker 170 is a component that outputs not only various kinds of audio data processed at the processor 130, but also various kinds of notification sounds or voice messages, etc.

The camera 180 is a component for photographing a still image or a moving image. The camera 180 may photograph a still image on a specific time point, but may also photograph a still image consecutively.

The camera 180 may photograph the actual environment in front of the display apparatus 100 by photographing the front side of the display apparatus 100. The processor 130 may identify the another display apparatus 200 through the camera 180.

The camera 180 includes a lens, a shutter, an aperture, a solid state imaging element, an analog front end (AFE), and a timing generator (TG). The shutter adjusts the time when a light reflected on a subject enters the camera 180, and the aperture adjusts a light amount introduced into the lens by mechanically increasing or decreasing the size of an opening through which a light enters. When a light reflected on a subject is accumulated as photo charges, the solid state imaging element outputs a phase by the photo charges as an electric signal. The TG outputs a timing signal for reading out pixel data of the solid state imaging element, and the AFE samples an electric signal output from the solid state imaging element and digitalizes the signal.

As described above, the display apparatus 100 can provide more immersion and stereoscopic effect to a user by expanding the screen area to the another display apparatus 200 arranged around it.

Below, operations of the display apparatus 100 will be explained in more detail through FIG. 4 to FIG. 9. In FIG. 4 to FIG. 9, individual embodiments will be explained for the convenience of explanation. However, the individual embodiments in FIG. 4 to FIG. 9 may be implemented in any combined states.

Figure 4:
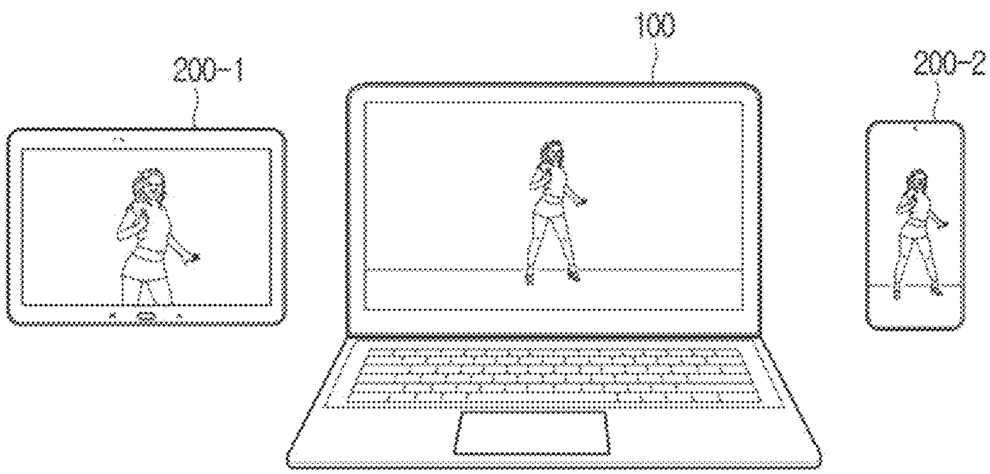
FIG. 4 is a diagram for illustrating expansion of a screen area to a plurality of other display apparatuses, according to an embodiment of the disclosure.

FIG. 4 is a diagram for illustrating expansion of a screen area to a plurality of other display apparatuses according to an embodiment of the disclosure.

The processor 130 may perform communication with the first another display apparatus 200-1 and the second another display apparatus 200-2 around the display apparatus 100, and identify the locations of the first another display apparatus 200-1 and the second another display apparatus 200-2. For example, as illustrated in FIG. 4, the processor 130 may perform communication with the first another display apparatus 200-1 and the second another display apparatus 200-2 through the ultra-wideband (UWB) communication standard, and identify the locations of the first another display apparatus 200-1 and the second another display apparatus 200-2.

When communication with the first another display apparatus 200-1 and the second another display apparatus 200-2 is connected through the UWB communication standard, the processor 130 may identify the locations of the first another display apparatus 200-1 and the second another display apparatus 200-2. Alternatively, when communication with the first another display apparatus 200-1 and the second another display apparatus 200-2 is connected through the UWB communication standard, the processor 130 may identify the locations of the first another display apparatus 200-1 and the second another display apparatus 200-2 by a predetermined time interval. Alternatively, when a predetermined application is executed, the processor 130 may identify the location of the another display apparatus 200 of which communication with the display apparatus 100 has been connected through the UWB communication standard.

When communication with the first another display apparatus 200-1 and the second another display apparatus 200-2 is connected through the UWB communication standard, the processor 130 may request the use states of the first another display apparatus 200-1 and the second another display apparatus 200-2, and if the first another display apparatus 200-1 and the second another display apparatus 200-2 are in unused states, the processor 130 may transmit an image related to an image being displayed on the display apparatus 100 to the first another display apparatus 200-1 and the second another display apparatus 200-2.

For example, the processor 130 may control the display 110 to display the first image, identify a motion of an object included in the first image, obtain a second image including the object based on the identified motion, and if the first another display apparatus 200-1 and the second another display apparatus 200-2 are in unused states, the processor 130 may transmit the second image to the first another display apparatus 200-1 and the second another display apparatus 200-2.

The processor 130 may determine at least one of an obtaining method of the second image or a transmission method of the second image based on the motion of the object in the first image. For example, if a motion is identified without a movement of the object in the first image, the processor 130 may obtain the second image including the object, and transmit the second image to the first another display apparatus 200-1 and the second another display apparatus 200-2 as illustrated in FIG. 4.

Alternatively, if a movement of the object is identified in the first image, the processor 130 may obtain the second image or transmit the obtained second image based on at least one of the location of the object in the frame, the moving direction, or the location of an ambient display apparatus. For example, if the object moves to the right in the first image, the processor 130 may obtain the time of moving from the location of the object in the frame to the location of the second another display apparatus 200-2 based on the moving speed of the object, and transmit the second image including the object to the second another display apparatus 200-2 after the obtained time passes. Also, as the object moves to the right, the processor 130 may not transmit the second image to the first another display apparatus 200-1.

Figure 5:
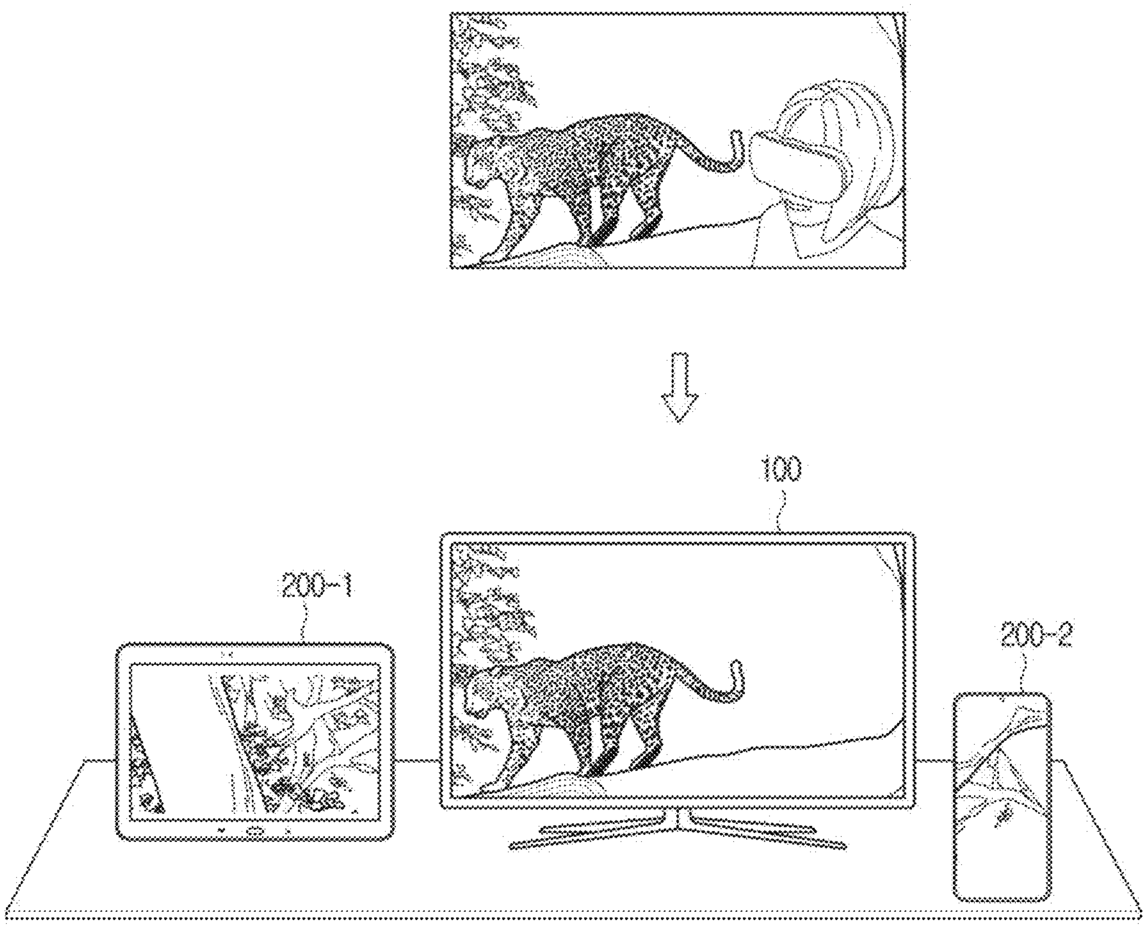
FIG. 5 is a diagram for illustrating an embodiment regarding a 3D space, according to an embodiment of the disclosure.

FIG. 5 is a diagram for illustrating an embodiment regarding a 3D space according to an embodiment of the disclosure.

As illustrated on the upper side of FIG. 5, a user may view an image formed as a 3D space through 3D glasses. In this case, the 3D glasses may display only some areas corresponding to the direction which the user's face is toward in the image formed as a 3D space.

The display apparatus 100 may store the image formed as a 3D space as on the upper side of FIG. 5. The processor 130 may control the display 110 to display some areas of the image formed as a 3D space.

The processor 130 may identify the locations of the first another display apparatus 200-1 and the second another display apparatus 200-2, and if the first another display apparatus 200-1 and the second another display apparatus 200-2 are in unused states, the processor 130 may transmit an image of an area corresponding to the location of the first another display apparatus 200-1 in the image formed as a 3D space to the first another display apparatus 200-1, and transmit an image of an area corresponding to the location of the second another display apparatus 200-2 in the image formed as a 3D space to the second another display apparatus 200-2.

The processor 130 may identify the locations of the first another display apparatus 200-1 and the second another display apparatus 200-2 by the predetermined time interval, and if their locations are changed, provide an image of areas corresponding to the changed locations in the image formed as a 3D space.

Figure 6:
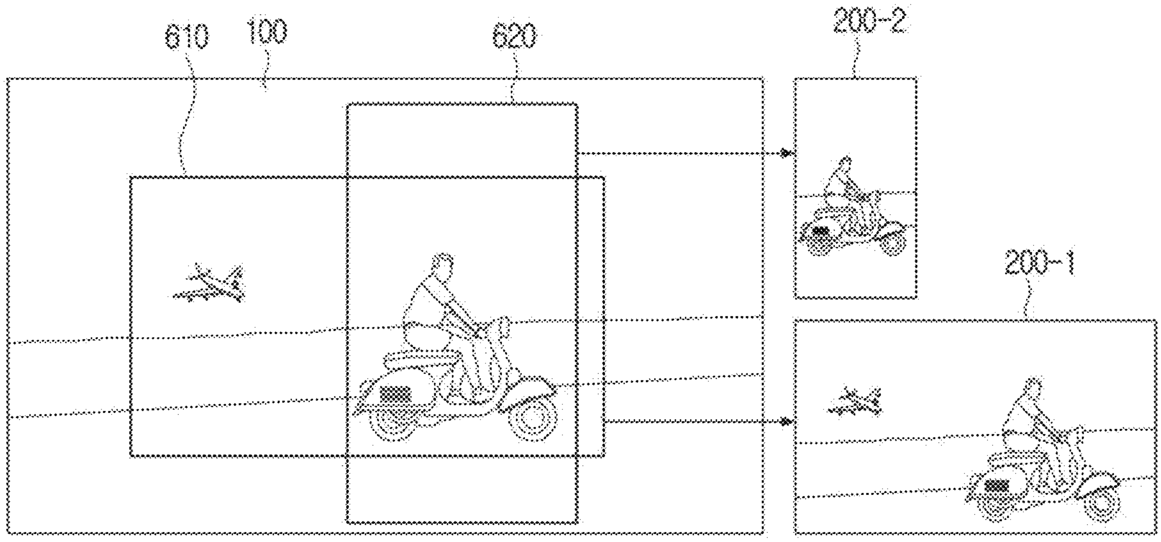
FIG. 6 is a diagram for illustrating a method of using information on another display, according to an embodiment of the disclosure.

FIG. 6 is a diagram for illustrating a method of using information on another display according to an embodiment of the disclosure.

The processor 130 may control the communication interface 120 to transmit a signal requesting information on another display included in another display apparatus to the another display apparatus, receive the information on the another display from the another display apparatus through the communication interface 120, and obtain the second image based on an identified motion and the information on the another display.

For example, as illustrated in FIG. 6, the processor 130 may control the communication interface 120 to transmit a signal requesting information on a first another display included in the first another display apparatus 200-1 to the first another display apparatus 200-1, receive the information on the first another display from the first another display apparatus 200-1 through the communication interface 120, and obtain a second image 1 based on an identified motion and the information on the first another display. For example, the processor 130 may obtain the second image 1 corresponding to the resolution and the screen ratio of the first another display.

Also, as illustrated in FIG. 6, the processor 130 may control the communication interface 120 to transmit a signal requesting information on a second another display included in the second another display apparatus 200-2 to the second another display apparatus 200-2, receive the information on the second another display from the second another display apparatus 200-2 through the communication interface 120, and obtain a second image 2 based on an identified motion and the information on the second another display. For example, the processor 130 may obtain the second image 2 corresponding to the resolution and the screen ratio of the second another display.

Accordingly, the second image 1 may be an image of a screen ratio of 16:9, and the second image 2 may be an image of a screen ratio of 9:16.

In case an object included in the first image is not included at the resolution of the second another display, the processor 130 may obtain the second image 2 by performing scaling. For example, if the resolution of the second another display is 480×800, and the resolution of the quadrangle area 620 including a motorcycle on the left side of FIG. 6 is 960×1600, the processor 130 may obtain the second image 2 by downscaling the resolution of the quadrangle area including the motorcycle.

The processor 130 may also obtain the second image based on the form factor of the another display. For example, in case the second another display apparatus 200-2 is a foldable apparatus, and the upper display and the lower display of the second another display apparatus 200-2 do not form an angle of 180 degrees, the processor 130 may obtain the second image 2 of 480×400 but not the second image 2 of 480×800 corresponding to the resolutions of the upper display and the lower display. When the second image 2 is received from the display apparatus 100, the second another display apparatus 200-2 may display the second image 2 on one of the upper display or the lower display.

When a plurality of objects are identified in the first image, the processor 130 may obtain the second image including at least one of the plurality of objects based on at least one of the sizes or the motions of each of the plurality of objects. For example, as illustrated in FIG. 6, the processor 130 may identify a motorcycle and an airplane in the first image (610), and as the motorcycle is bigger than the airplane, the processor 130 may obtain the second image including the motorcycle.

However, embodiments of the disclosure are not limited thereto, and the processor 130 may obtain the second image by further considering information on the another display. For example, the processor 130 may obtain the second image 2 (620) including only the motorcycle based on the screen ratio of the second another display. However, if it is determined that the airplane may also be included when considering the screen ratio of the first another display, the processor 130 may obtain the second image 1 including the motorcycle and the airplane.

In FIG. 6, it is illustrated that, even if an object moves, the display apparatus 100, the first another display apparatus 200-1, and the second another display apparatus 200-2 simultaneously display an image including the same object, but embodiments of the disclosure are not limited thereto. For example, if the display apparatus 100 displays the motorcycle, and the motorcycle moves to the right and disappears through the right edge of the display apparatus 100, the another display apparatus 200-1 may display the motorcycle.

Figure 7:
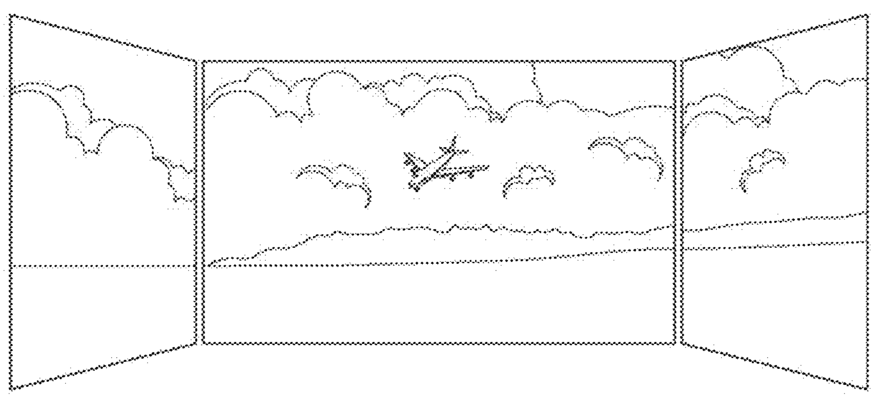
FIG. 7 and FIG. 8 are diagrams for illustrating an operation of considering an alignment state of display apparatuses, according to an embodiment of the disclosure.
Figure 8:
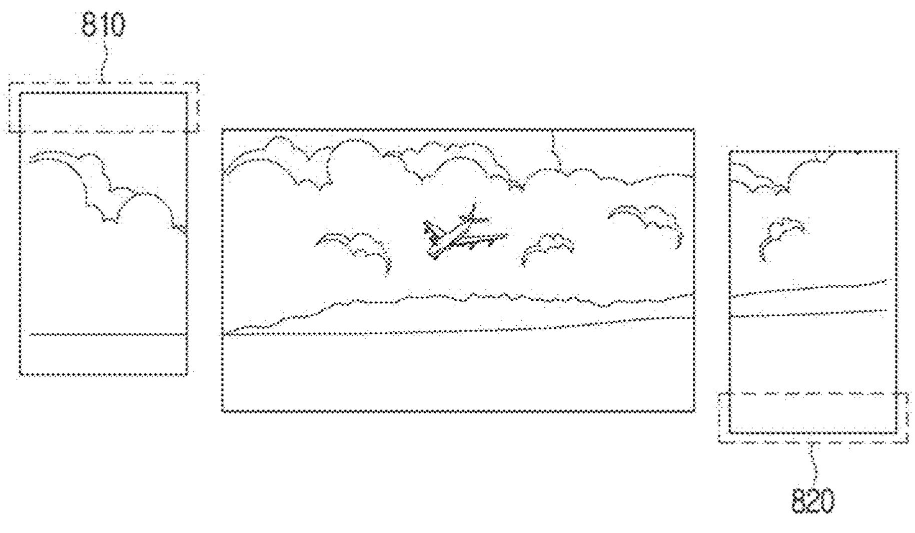

FIG. 7 and FIG. 8 are diagrams for illustrating an operation of considering an alignment state of display apparatuses according to an embodiment of the disclosure.

FIG. 7 illustrates the display apparatus 100, the first another display apparatus on the left side of the display apparatus 100, and the second another display apparatus on the right side of the display apparatus 100. Also, in FIG. 7, it was assumed that the upper edges of each of the display apparatus 100, the first another display apparatus, and the second another display apparatus are arranged on the same line, and the lower edges of each of the display apparatus 100, the first another display apparatus, and the second another display apparatus are arranged on the same line.

However, depending on cases, as illustrated in FIG. 8, the upper edges and the lower edges of each display apparatus may not be arranged on the same line. In this case, the processor 130 may identify the alignment state of the display apparatus 100, the first another display apparatus, and the second another display apparatus, and obtain the second image based on the alignment state.

For example, the processor 130 may identify the alignment state of the display apparatus 100, the first another display apparatus, and the second another display apparatus, and if the upper edge and the lower edge of the first another display are respectively higher than the upper edge and the lower edge of the display apparatus 100, outpaint an area 810 higher than the upper edge of the display apparatus 100 and obtain the second image 1. If the upper edge and the lower edge of the second another display are respectively lower than the upper edge and the lower edge of the display apparatus 100, the processor 130 may output an area 820 lower than the upper edge of the display apparatus 100 and obtain the second image 2.

Through such an operation, a sense of difference between the first image and the second images output through the display apparatus 100, the first another display apparatus, and the second another display apparatus can be minimized.

Figure 9:
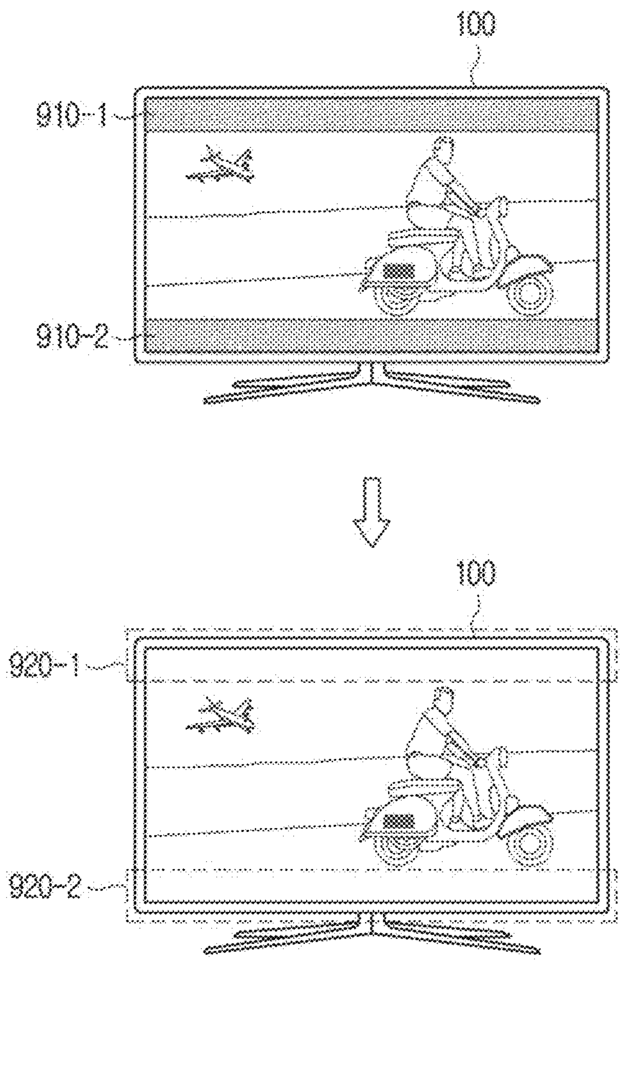
FIG. 9 is a diagram for illustrating an operation on a single screen, according to an embodiment of the disclosure.

FIG. 9 is a diagram for illustrating an operation on a single screen according to an embodiment of the disclosure.

The processor 130 may change the first image such that the screen ratio of the first image corresponds to the screen ratio of the display 110 through outpainting. For example, the processor 130 may display the first image of 1.85:1 as on the upper side of FIG. 9, and in this case, the area 910-1 and the area 910-2 may be displayed in a black color. The processor 130 may identify that the screen ratio of the first image and the screen ratio of the display 110 are different, and change the first image to the first image of 16:9 of the display 110 as on the lower side of FIG. 9. In this case, the processor 130 may change the first image of 1.85:1 to the first image of 16:9 by outpainting the area 910-1 and the area 910-2 respectively like the area 920-1 and the area 920-2.

However, embodiments of the disclosure are not limited thereto, and the processor 130 may outpaint the first image by further considering an object. For example, in case the airplane moves to the upper side in the first image on the upper side of FIG. 9 and a part of the airplane is not seen through the area 910-1, the processor 130 may outpaint as on the lower side of FIG. 9, and here, the part of the airplane that was not seen may be expressed in the area 920-1 based on the form of the airplane in the previous frame.

Figure 10:
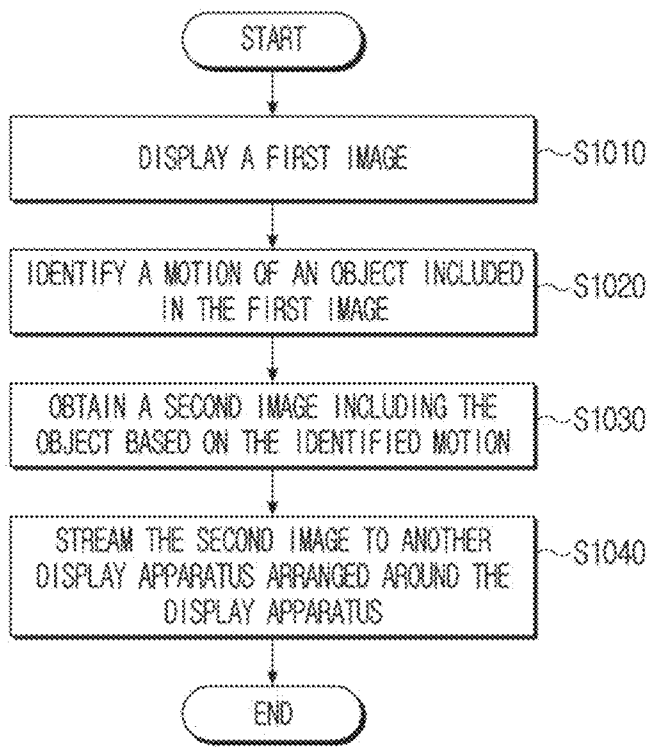
FIG. 10 is a flow chart for illustrating a control method of a display apparatus, according to an embodiment of the disclosure.

FIG. 10 is a flow chart for illustrating a control method of a display apparatus according to an embodiment of the disclosure.

First, a first image is displayed in operation S1010. Then, a motion of an object included in the first image is identified in operation S1020. Then, a second image including the object is obtained based on the identified motion in operation S1030. Then, the second image is streamed to another display apparatus arranged around the display apparatus in operation S1040.

Also, in the streaming operation S1040, the second image may be streamed to the another display apparatus arranged in a location corresponding to the identified motion among a plurality of other display apparatuses located around the display apparatus.

In addition, the control method may further include the step of identifying the location of the another display apparatus by performing communication with the another display apparatus, and in the obtaining operation S1030, the second image may be obtained based on the identified motion and the location of the another display apparatus.

Further, in the operation of identifying the location of the another display apparatus, the location of the another display apparatus may be identified by performing communication with the another display apparatus through an ultra-wide-band (UWB) communication standard.

Also, in the obtaining operation S1030, a signal requesting information on another display included in the another display apparatus may be transmitted to the another display apparatus, the information on the another display may be received from the another display apparatus, and the second image may be obtained based on the identified motion and the information on the another display.

In addition, the information on the another display may include at least one of a size, a resolution, a screen ratio, or a form factor of the another display.

Further, in the obtaining operation S1030, the second image may be obtained by outpainting a background area of the object.

Also, in the obtaining operation S1030, a sound of the second image may be generated based on a sound of the object included in the first image.

In addition, the control method may further include the step of identifying an alignment state of the display apparatus and the another display apparatus, and in the obtaining operation S1030, the second image may be obtained based on the alignment state.

Also, the control method may further include the step of, based on receiving guide information that the another display apparatus is used from the another display apparatus, stopping an obtaining operation of the second image and a streaming operation of the second image.

According to the various embodiments of the disclosure as described above, the display apparatus can provide more immersion and stereoscopic effect to a user by expanding the screen area to another display apparatus arranged around it.

According to an embodiment of the disclosure, the aforementioned various embodiments may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments (e.g., an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' means that a storage medium does not include signals, and is tangible, but does not indicate whether data is stored in the storage medium semi-permanently or temporarily.

Also, according to an embodiment of the disclosure, the method according to the aforementioned various embodiments may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., PLAY STORE™). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the aforementioned various embodiments may be implemented in a recording medium that can be read by a computer or an apparatus similar to a computer, by using software, hardware, or a combination thereof. In some cases, the embodiments described in this disclosure may be implemented as the processor itself. According to implementation by software, the embodiments such as processes and functions described in this disclosure may be implemented as separate software modules. Each of the software modules can perform one or more functions and operations described in this disclosure.

Computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disk, a blue-ray disk, a USB, a memory card, a ROM and the like.

Also, each of the components according to the aforementioned various embodiments (e.g., a module or a program) may consist of a singular object or a plurality of objects. Also, among the aforementioned corresponding sub components, some sub components may be omitted, or other sub components may be further included in the various embodiments. Alternatively or additionally, some components (e.g., a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

In addition, while example embodiments of the disclosure have been shown and described, the disclosure is not limited to the aforementioned embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display apparatus comprising:

a display;

a communication interface;

memory configured to store instructions; and at least one processor operatively connected with the display, the communication interface, and the memory, and configured to execute the instructions, wherein the instructions, when executed by the at least one processor, cause the display apparatus to:

display a first image on the display;

identify a motion of an object included in the first image;

identify a location of another display apparatus by performing communication with the another display apparatus through the communication interface;

obtain a second image including the object based on the identified motion and the location of the another display apparatus; and stream the second image to the another display apparatus through the communication interface.

2. The display apparatus of claim 1, wherein the instructions, when executed by the at least one processor, further cause the display apparatus to stream, through the communication interface, the second image to the another display apparatus that is in a location corresponding to the identified motion among a plurality of other display apparatuses located in a vicinity the display apparatus.

3. The display apparatus of claim 1, wherein the instructions, when executed by the at least one processor, further cause the display apparatus to identify the location of the another display apparatus by performing communication with the another display apparatus through an ultra-wideband communication standard.

4. The display apparatus of claim 1, wherein the instructions, when executed by the at least one processor, further cause the display apparatus to:

transmit, through the communication interface, a signal to the another display apparatus requesting the information on another display included in the another display apparatus.

5. The display apparatus of claim 4, wherein the information on the another display comprises at least one of a size, a resolution, a screen ratio, or a form factor of the another display.

6. The display apparatus of claim 1, wherein the instructions, when executed by the at least one processor, further cause the display apparatus to obtain the second image by outpainting a background area of the object.

7. The display apparatus of claim 1, wherein the instructions, when executed by the at least one processor, further cause the display apparatus to generate a sound of the second image based on a sound of the object included in the first image.

8. The display apparatus of claim 1, wherein the instructions, when executed by the at least one processor, further cause the display apparatus to:

identify an alignment state of the display apparatus and the another display apparatus; and obtain the second image based on the alignment state.

9. The display apparatus of claim 1, wherein the instructions, when executed by the at least one processor, further cause the display apparatus to, based on obtaining guide information that the another display apparatus is used from the another display apparatus through the communication interface, stop an obtaining operation of the second image and a streaming operation of the second image.

10. A control method of a display apparatus, the control method comprising:

displaying a first image;

identifying a motion of an object included in the first image;

identifying a location of another display apparatus by performing communication with the another display apparatus;

obtaining a second image including the object based on the identified motion and the location of the another display apparatus; and streaming the second image to the another display apparatus.

11. The control method of claim 10, wherein the streaming comprises streaming the second image to the another display apparatus that is in a location corresponding to the identified motion among a plurality of other display apparatuses located in a vicinity of the display apparatus.

12. The control method of claim 10, wherein the identifying the location of the another display apparatus comprises identifying the location of the another display apparatus by performing communication with the another display apparatus through an ultra-wideband communication standard.

13. The control method of claim 10, wherein the obtaining comprises:

transmitting a signal to the another display apparatus requesting information on another display included in the another display apparatus.

14. A display apparatus comprising:

at least one memory configured to store instructions, wherein the instructions, when executed by at least one processor, cause the display apparatus to:

display a first image;

identify a motion of an object included in the first image;

identify a location of another display apparatus by performing communication with the another display apparatus;

obtain a second image including the object based on the identified motion and the location of the another display apparatus; and stream the second image to the another display apparatus.

15. The display apparatus of claim 14, wherein the instructions, when executed by the at least one processor, further cause the display apparatus to stream the second image to the another display apparatus that is in a location corresponding to the identified motion among a plurality of other display apparatuses located in a vicinity of the display apparatus.

16. The display apparatus of claim 14, wherein the instructions, when executed by the at least one processor, further cause the display apparatus to identify the location of the another display apparatus by performing communication with the another display apparatus through an ultra-wideband communication standard.

17. The display apparatus of claim 14, wherein the instructions, when executed by the at least one processor, further cause the display apparatus to:

transmit a signal to the another display apparatus requesting information on another display included in the another display apparatus.

* * * * *